(12) United States Patent
Thomas et al.

(10) Patent No.: US 12,724,181 B2
(45) Date of Patent: Sep. 1, 2026

(54) ATTRITABLE CERAMIC MIRROR FOR SPACE APPLICATION

(71) Applicant: CoorsTek, Inc., Golden, CO (US)

(72) Inventors: Warren Andrew Thomas, Lakewood, CO (US); Randel F. Mercer, Boulder, CO (US); Patrick Michael Bickley, Timnath, CO (US)

(73) Assignee: CoorsTek, Inc., Golden, CO (US)

( * ) Notice: Subject to any disclaimer, the term of this patent is extended or adjusted under 35 U.S.C. 154(b) by 249 days.

(21) Appl. No.: 18/647,058

(22) Filed: Apr. 26, 2024

(65) Prior Publication Data

US 2024/0369745 A1 Nov. 7, 2024

Related U.S. Application Data

(60) Provisional application No. 63/499,801, filed on May 3, 2023.

(51) Int. Cl.
*G02B 5/08* (2006.01)

(52) U.S. Cl.
CPC .................................. *G02B 5/0808* (2013.01)

(58) Field of Classification Search
CPC .................................................... G02B 5/0808
See application file for complete search history.

(56) References Cited

U.S. PATENT DOCUMENTS 3,688,988 A 9/1972 Howison et al.
4,472,476 A 9/1984 Veltri et al.
4,476,178 A 10/1984 Veltri et al.
4,963,393 A 10/1990 Goela et al.
5,071,596 A 12/1991 Goela et al.
5,448,418 A 9/1995 Hotate et al.
5,505,805 A * 4/1996 Papenburg ............. G02B 7/183 428/912.2
5,741,445 A 4/1998 Taylor et al.
6,206,531 B1 3/2001 Williams et al.
7,410,923 B2 8/2008 Otsuki et al.
10,294,163 B2 5/2019 Koga et al.
2007/0214834 A1 9/2007 Roeper et al.
2008/0202688 A1 8/2008 Wu et al.
2011/0221084 A1 9/2011 Goodman et al.
2012/0202054 A1 8/2012 Endler et al.
2014/0326403 A1 11/2014 Chand et al.
2016/0024648 A1 1/2016 Bolton
2017/0269265 A1 9/2017 Benson et al.

OTHER PUBLICATIONS

Cattani, B.M, et al., An Overview of Design for Demise Technologies, Proc. 8th European Conference on Space Debris (vitual), Darmstadt, Germany, Apr. 2021, published by ESA Space Debris Office, 11 pages.

(Continued)

*Primary Examiner* — James A Dudek

(57) ABSTRACT

Provided herein is a lightweight satellite component such as an optical mirror for aerospace applications and methods of making such lightweight components. The optical mirror comprises a graphite body and a SiC reflective layer formed on and integrated with the graphite body. The optical mirror is designed for demise upon re-entry into the Earth's atmosphere.

19 Claims, 6 Drawing Sheets

(56) References Cited

OTHER PUBLICATIONS

Garoli, Denis, et al., Mirrors for Space Telescopes: Degradation Issues, Applied Science, 2020, (10, 7538), published Oct. 2020, 23 pages.

Trisolini, Mirko, et al. Demisability and survivability sensitivity to design-for-demise techniques, Acta Astronautica, vol. 145, Apr. 2018, 45 pages.

Riley, David, et al., Design for Demise: Systems-level techniques to reduce re-entry casualty risk, Proc. 7th European Conference on Space Debris, Darmstadt, Germany, Apr. 2017, published by ESA Space Debris Office, 6 pages.

Riley, David, et al., Design for Demise: Techniques to Reduce Re-Entry Casualty Risk, 66th International Astronautical Congress, 2015, 9 pages.

Jacobson, Mindy, et al., Space Based Truss Design for Demise Using Graphite Epoxy and Metal Matrix Composites, American Institute of Aeronautics and Astronautics, 2005, 13 pages.

Park, Seong-Hyeon, et al., Re-entry analysis of critical components and materials for design-for-demise techniques, Advances in Space Research, vol. 68, Issue 1, Jul. 2021, 24 pages.

Schroeder, B., et al., Ceramic Coatings for HTR Graphitic Structures—Tests and Experiments with SiC-Coated Graphitic Specimens, Organization for Economic Co-Operation and Development, Sep. 1999, 13 pages.

Ebizuka, Noboru, et al., Development of SiC Ultra Light Mirror for Large Space Telescope and for Extremely Huge Ground Based Telescope, Procedings of SPIE—The International Society for Optical Engineering, Feb. 2003, 6 pages.

Kim, Jeon-Pyo, et al., Oxidation Behavior and Microstructural Evolution of Grpahite Substances with SiC and Si3N4 Coatings Prepared by Using a Solid-Vapor Reaction, Journal of the Korean Physical Society, vol. 54, No. 3, Mar. 2009, pp. 1172-1179.

* cited by examiner

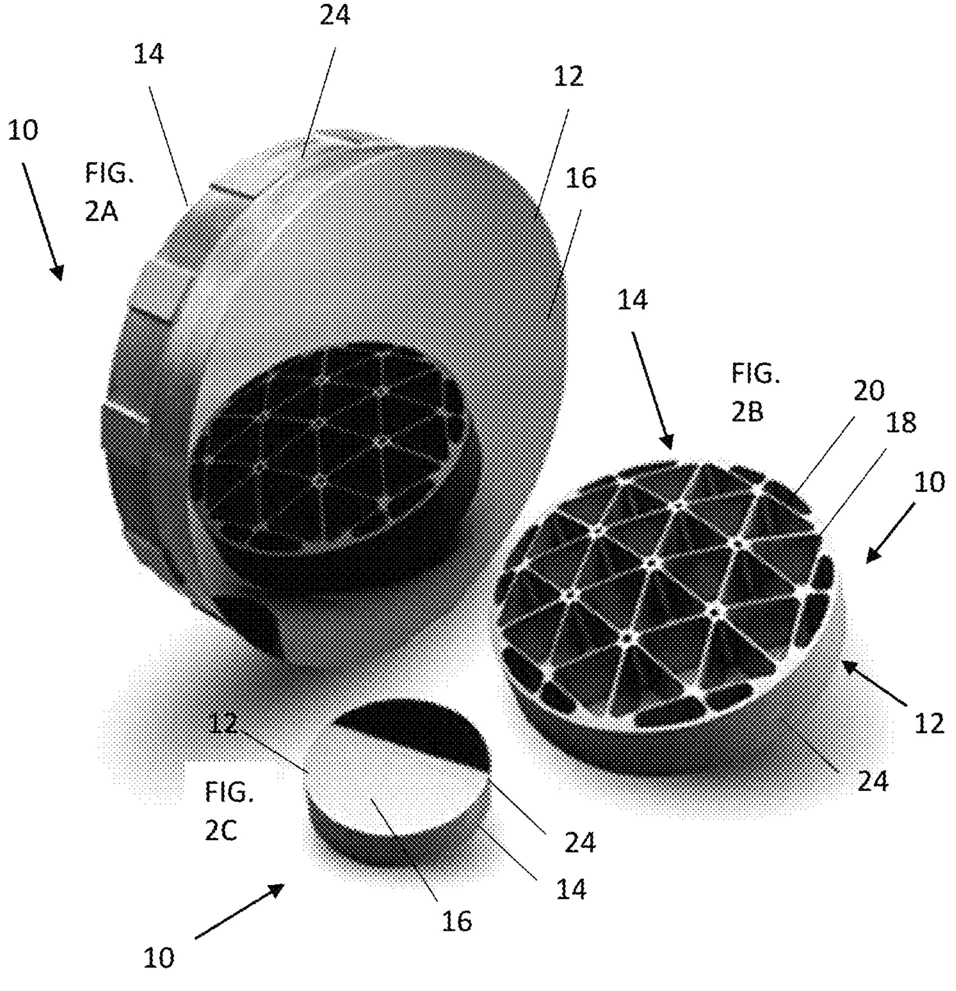
24
14
12
10
FIG.
2A
16
14
FIG.
2B
20
18
10
12
12
24
FIG.
2C
24
14
16
10

ATTRITABLE CERAMIC MIRROR FOR SPACE APPLICATION

CROSS-REFERENCE TO RELATED APPLICATIONS

This application claims priority to U.S. Provisional Patent Application 63/499,801 filed May 3, 2023, incorporated herein by reference in its entirety.

FIELD

The present disclosure generally relates to lightweight satellite components such as optical mirrors or structural struts for space applications that are designed for demise upon re-entry into the Earth's atmosphere, and methods of making such satellite components.

BACKGROUND

Space debris orbiting the Earth is of increasing concern. One approach to reduce the amount of space debris is through re-entry of satellites and other space hardware into the Earth's atmosphere; however, to minimize the risk to human population, the risk of casualties due to the re-entry must be very low. Controlled re-entry involves guiding satellites and other space hardware such that the object impacts the Earth's surface in a designated zone, such as an ocean or unpopulated area, which typically results in increases to the complexity, cost, and the weight of the system. Uncontrolled re-entry, which may occur through natural orbital decay, is a simpler and cheaper alternative and allows for the disposal of satellites and other space hardware at the end of their operational lifetime. In this approach, the object ideally burns up upon re-entry as it passes through the atmosphere. Ensuring the complete or near-complete burn-up of the various components during re-entry is essential to meeting safety guidelines.

"Design for demise" technologies are intentionally designed to disintegrate during re-entry into the Earth's atmosphere and/or to reduce the size of the impact zone. A number of design choices (e.g., the material of the component, its shape and dimension, location within the device, etc.) impact the demisability of a component upon re-entry. These design choices, however, must be balanced against the survivability of the component during launch and while in orbit, without compromising the operation life of the component. The component must be able to resist the extreme environment of space yet disintegrate upon re-entry into the Earth's atmosphere.

A number of critical components in a satellite have been identified as increasing the risk of casualties during an uncontrolled re-entry event. Among these components, optical mirrors are used in a wide range of aerospace sensing and imaging applications, for example, telescopes; fast steering mirrors for scanning, tracking, sighting, and alignment; laser communications and high-energy laser systems; and gimbaled multi-spectral sensors for remote sensing. Optical mirrors are typically made of ceramic materials that do not readily burn up upon re-entry. Structural members such as struts of a may also be made of ceramic materials. These systems require high specific stiffness and high thermal stability, making the substitution of materials to increase their demisablity challenging.

SUMMARY

In some embodiments, an optical mirror is described. The mirror includes a graphite body having a face plate and a support base and a silicon carbide (SiC) reflective layer integrally formed on the outer surface of the face plate. A bottom surface of the support base is positioned beneath the face plate comprises exposed graphite.

In some embodiments, at least a portion of the bottom surface of the support base is not coated with SiC. In some embodiments, the SiC reflective layer is deposited on the outer surface of the face plate using chemical vapor deposition.

In some embodiments, the support base comprises a sidewall along a perimeter of the support base, the sidewall comprising graphite. In even more particular embodiments, the bottom surface comprises a plurality of ribs defining a plurality of openings, the sidewall comprising a plurality of access holes extending through the sidewall from an outer surface of the support body through the sidewall to the openings. In even more particular embodiments, the openings comprise exposed graphite and further comprising a bottom cover at least partially covering the bottom surface of the support base.

In some embodiments, the bottom surface comprises a plurality of ribs defining a plurality of openings, at least a portion of the plurality of ribs or a portion of the plurality of openings comprises the exposed graphite. In even more particular embodiments, the plurality of openings forms a series of circular ribs, a grid, an iso-grid, a tessellation, or a honeycomb structure. In other more particular embodiments, at least a portion of the plurality of the ribs is coated in SiC. In still other more particular embodiments, at least a portion of the openings is coated in SiC.

In some embodiments, the bottom surface includes a plurality of first portions coated with SiC, the plurality of first portions being separate from each other by a second portion of the bottom surface that is not coated with SiC. In other embodiments, the bottom surface is configured to break into the plurality of first portions upon disintegration of the optical mirror.

In some embodiments, a method for making an optical mirror is provided. The method includes providing a graphite body comprising a face plate and a support base, wherein the support base is positioned beneath the face plate and integrated with the bottom surface of the face plate. The method also includes depositing a layer of SiC using chemical vapor deposition on the outer surface of the face plate, wherein a bottom surface of the support base positioned beneath the face plate comprises exposed graphite. The method also includes polishing the layer of SiC on the outer surface of the face plate to form a reflective surface.

In some embodiments, the method also includes applying a mask to the support base to prevent deposition of SiC onto a portion of the support base covered by the mask and removing the mask to expose the exposed graphite. In other embodiments, the method also includes depositing a layer of SiC using chemical vapor deposition on the bottom surface of the support base and mechanically removing a portion of the SiC deposited on the bottom surface of the support base to expose the exposed graphite.

In some embodiments of the method, the bottom surface comprises a plurality of ribs defining a plurality of openings, at least a portion of the plurality of ribs or a portion of the plurality of openings comprises the exposed graphite. In some more particular embodiments, the plurality of openings forms a series of circular ribs, a grid, an iso-grid, a tessellation, or a honeycomb structure. In other more particular embodiments, at least a portion of the plurality of the ribs is coated in SiC. In still other more particular embodiments, at least a portion of the openings is coated in SiC.

In some embodiments, a satellite payload is provided. The payload includes an optical mirror having a graphite body comprising a face plate and a support base; and a silicon carbide (SiC) reflective layer integrally formed on the outer surface of the face plate, wherein a bottom surface of the support base positioned beneath the face plate comprises exposed graphite.

In some embodiments, a satellite component is provided. The component comprises a graphite body having a first outer surface coated with silicon carbide (SiC) and a second outer surface positioned beneath the first outer surface, the second outer surface comprising exposed graphite. In a more particular embodiment, the satellite component is a satellite payload comprising an optical mirror; the graphite body comprises a face plate and a support base; the first outer surface coated with SiC is a reflective layer integrally formed on an outer surface of the face plate; and the second outer surface is a bottom surface of the support based positioned beneath the face plate. In another more particular embodiment, the satellite component is a structural strut.

FIGURES

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIGS. 2A-2C are images of mirrors according to various embodiments of the disclosure.

DETAILED DESCRIPTION

Optical mirrors are utilized in a wide range of aerospace and satellite sensing and imaging applications, including space telescopes across ultraviolet (UV), visible (VIS), and/or infrared (IR) wavelengths, fast steering mirrors for scanning, tracking, sighting, and alignment, laser communications and high-energy laser systems, and gimbaled multi-spectral sensors for remote sensing.

Current aerospace optical mirrors are typically made from silicon (Si) and/or silicon carbide (SiC). Such mirrors generally comprise a support base comprised of SiC or lighter-weight support base such as graphite coated with SiC. The support base is attached to a face plate having an outer coating of Si or SiC deposited thereon using chemical vapor deposition and subsequently polished to optical quality. Compared with other materials, SiC has a high stiffness, low thermal expansion, and a high thermal conductivity. SiC also has a low specific mass, it is resistant to attack by atomic oxygen, and it has excellent reflective properties with low scatter. However, several of the beneficial properties that arise from the use of SiC, such as high stiffness and thermal stability, also increase the likelihood that such optical mirrors survive re-entry into the Earth's atmosphere, risking impact with the ground in re-entry events.

The present disclosure generally relates to light weight optical mirrors for aerospace applications that are designed for demise or attrition upon re-entry into the Earth's atmosphere, methods of making such optical mirrors, and satellites including such optical mirrors. Objects entering the atmosphere experience atmospheric drag, which puts mechanical stress on the object, and aerodynamic heating, which is mostly caused by compression of the air in front of the object. These forces can cause loss of mass and/or break-up of the object. Additionally, as the surface temperature of the object rises, reactions with oxygen and/or nitrogen may occur, leading to the formation of other materials that may degrade differently than the original material. In the context of the present disclosure, optical mirrors disclosed herein are designed using materials and configurations to promote disintegration under these conditions, referred to herein as attrition. This disintegration upon re-entry is driven by oxidation of the exposed graphite structure, which renders the mirror to be structurally unstable upon aerodynamic loads and temperatures seen upon re-entry into the Earth's atmosphere.

Figures 1A, 1B, 1C:
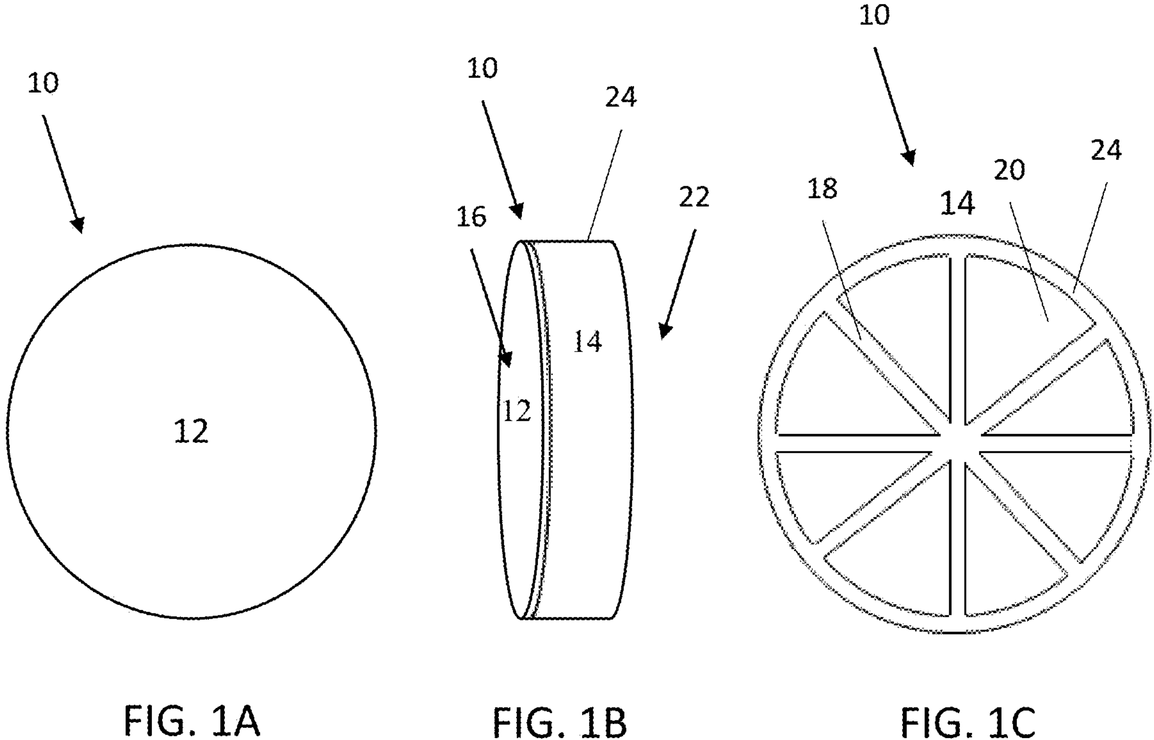
FIG. 1A is top view of a schematic drawing of a mirror according to one embodiment of the disclosure.
FIG. 1B is a side view of the mirror embodiment shown in FIG. 1A.
FIG. 1C is a bottom view of the mirror embodiment shown in FIG. 1A.

Referring first to FIGS. 1A-1C, an exemplary optical mirror 10 is illustrated. Mirror 10 includes face plate 12 and support base 14. Portions of face plate 12 may be formed on or integrated with support base 14.

In some embodiments, face plate 12 comprises SiC. Face plate 12 includes reflective layer 16. Reflective layer 16 may be integral with face plate 12, or reflective layer 16 may be a separate layer of material applied to face plate 12. Reflective layer 16 comprises a polished optical grade material, such as SiC. In some embodiments, the face plate 12 and reflective layer 16 are a single integral layer of polished SiC. Reflective layer 16 forms an outer surface of face plate 12 that is smooth and uniform, and may be concave, convex, or planar in shape.

Optical mirror 10 is illustrated in FIG. 1 generally in terms of a circular mirror, however mirror 10, however, the mirror may be any suitable shape depending upon the application. Further, the dimensions of the mirror 10 are not particularly limited, for instance, mirrors having an aperture of several feet (one to two meters) may be formed. The face plate 12 comprising the reflective layer 16 may be flat or it may be concave or convex. The mirror may comprise more than one reflective surface, for instance the mirror may comprise two reflective surfaces, or in some instances three reflective surfaces or more. The mirror may a symmetrical mirror, an off-axis aspheric mirror, or another geometry such as a corner reflector mirror.

Support base 14 is illustratively comprised of graphite and is positioned beneath face plate 12 and integrated with a rear surface of face plate 12 opposite reflective layer 16. Support base 14 is illustratively comprised of graphite. Support base 14 may include one or more ribs 18 defining a plurality of openings 20 formed as voids or cut-outs (i.e., sections where material has been removed or is absent) to reduce the overall mass of the mirror. Ribs 18 and cut-outs 20 are illustratively positioned on a bottom surface 22 of support base 14. The mirror 10 may further comprise one or more mounting interface surfaces (e.g., bond pads) that are in contact with the support base 14 to mount the mirror to an optical payload (not shown).

The use of graphite to form part or all of the support base 14 imparts several benefits. Like SiC, graphite has a low specific mass, a low coefficient of thermal expansion, and high thermal conductivity. However, at elevated temperatures, such as those experienced during re-entry, graphite reacts with oxygen to form volatile products (CO and $CO_2$), and is more likely to break apart than SiC, thereby more readily disintegrating the body of the mirror. In contrast, SiC reacts with oxygen to form a $SiO_2$ layer which slowly thermally disintegrates. By exposing graphite to the atmosphere during reentry rather than a solid SiC support base or support base completely coated with SiC, the mirror is more likely to disintegrate. Upon re-entry, the graphite containing body disintegrates, leaving the only face plate 12 including reflective layer. Because the reflective layer is thin, it may also disintegrates and/or breaks into smaller fragments that are less likely to cause concern upon re-entry.

Preferably, SiC is deposited directly on the side using chemical vapor deposition (CVD). Graphite may be exposed by covering portion with a masking material during CVD deposition of SiC or by removing deposited SiC.

Due to the high cost of space transportation, the weight of the illustrative mirror 10 is relatively low. While graphite has a low specific mass, the support base preferably has a plurality of opening 20 to reduce its mass. This structure also reduces the amount of material that is required to disintegrate upon re-entry, and it also increases the surface area of the material that is exposed to the atmosphere during re-entry thereby promoting its disintegration. The openings 20 are interspaced with solid graphite ribs 18, which are spatially configured to ensure that the base is ridged and can sufficiently support the face plate 12. The plurality of openings 20, or conversely the solid ribs 18 of the support body 14, may form any suitable pattern on bottom surface 22 including a series of ribs, a grid, an iso-grid, a tessellation of any suitable shape or combination of shapes, or a honeycomb structure.

At least some of bottom surface 20, and in some embodiments all of bottom surface 20, including any ribs 18 and/or openings 20 comprises exposed graphite material, meaning graphite material that is not coated with SiC. The exposed graphite material of bottom surface 20 allows for easier disintegration of support base 14 and mirror 10 upon reentry into the atmosphere.

Support base 14 may or may not be enclosed by a sidewall 24 along the perimeter of the structure. Sidewall 24 comprises a graphite material. In some embodiments, an outer surface of sidewall 24 is coated with SiC. In other embodiments, the outer surface of sidewall 24 is uncoated.

FIGS. 1B-1C show a support base 14 that comprises an outer perimeter 24 and a series of radial ribs 18 defining a plurality of pie-shaped triangular cut-outs 20.

Additional illustrative embodiments are illustrated in FIGS. 2A-2C, including a support base that comprises an outer perimeter with an interior iso-grid void space structure in FIG. 2C. In other embodiments, the plurality of openings forms a series of linear or circular ribs, a rectangular grid, an iso-grid, or a honeycomb structure.

Figures 3A, 3B, 3C:
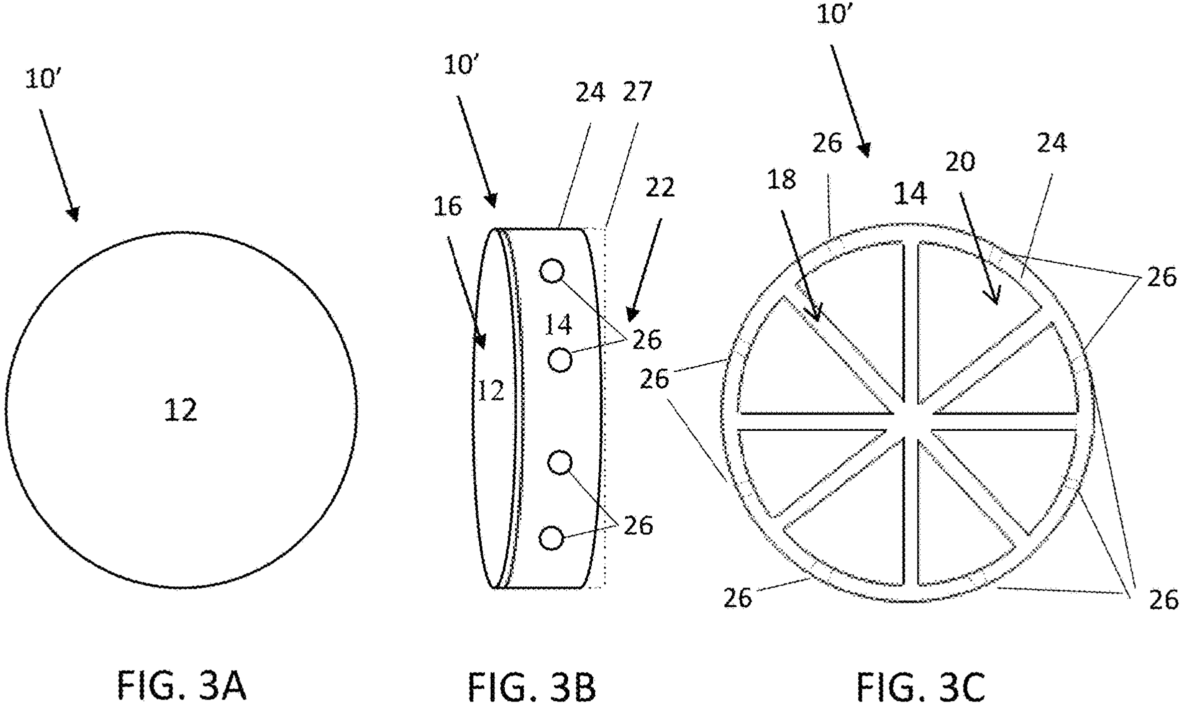
FIG. 3A is top view of a schematic drawing of a mirror according to another embodiment of the disclosure.
FIG. 3B is a side view of the mirror embodiment shown in FIG. 3A.
FIG. 3C is a bottom view of the mirror embodiment shown in FIG. 3A.

Referring next to FIGS. 3A-3C, another exemplary embodiment of mirror 10' is illustrated. Mirror 10' is similar to mirror 10 illustrated in FIGS. 1A-1C and similar part numbers are used to illustrate similar features.

As illustrated in FIGS. 3B and 3C, outer perimeter 24 of support body 14 includes one or more access holes 26 extending from an outer surface of support body 14 to openings 20 in the graphite material at the back of bottom surface 22. Access holes 26 allow for oxygen to more easily access the exposed graphite of support body 14 present in openings 20 during reentry, particularly where mirror 10' includes an optional bottom cover 27 (shown in dashed form in FIG. 3B) at least partially or fully covering bottom surface 22. Bottom cover 27 may be formed from graphite, SiC, graphite with an outer surface coated with SiC, or other suitable material.

Figure 4:
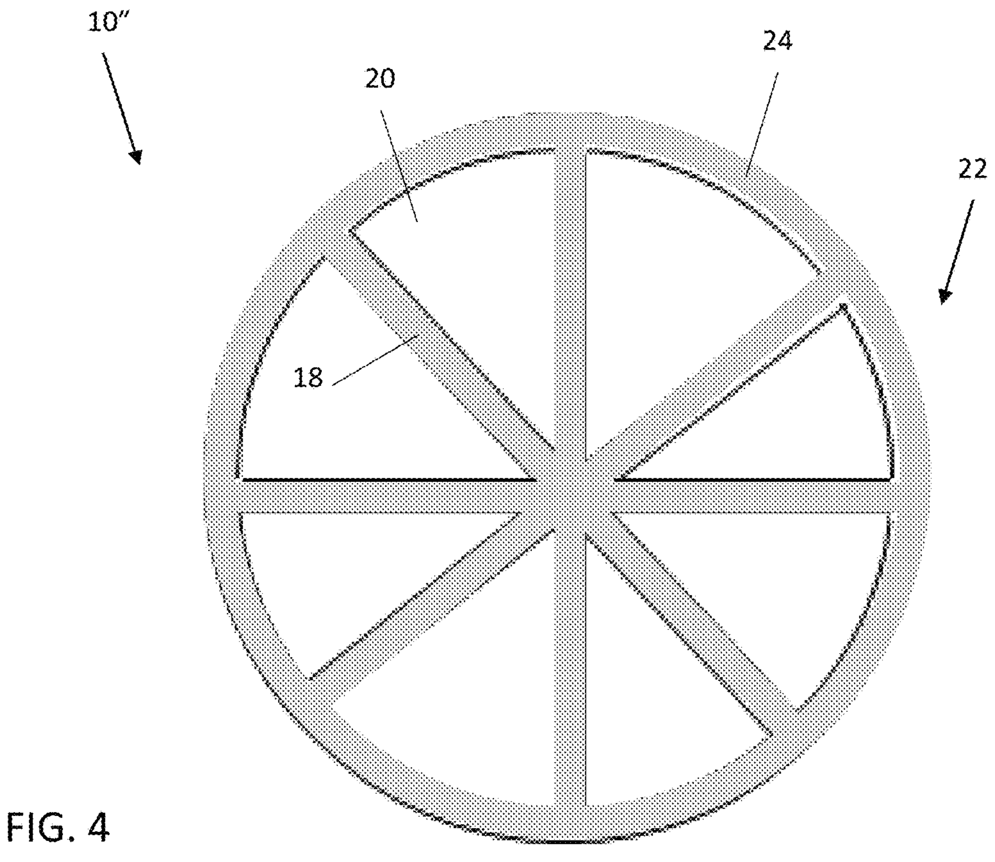
FIG. 4 is a schematic drawing of a mirror according to yet still another embodiment of the disclosure.

Referring next to FIG. 4, a bottom view of still another exemplary embodiment of mirror 10" is illustrated. Mirror 10" is similar to mirror 10 illustrated in FIGS. 1A-1C and similar part numbers are used to illustrate similar features.

Mirror 10" includes an open bottom surface 22 providing access to ribs 18 and openings 20 of support body 14. Mirror 10" includes ribs 18 coated with SiC, while openings 20 are exposed graphite. In some embodiments, outer sidewall 24 is also coated with SiC. The SiC coating on ribs 18 and optionally outer sidewall 24 provides additional structural strength to mirror 10". The exposed graphite material of openings 20 allows for easier disintegration of support base 14 and mirror 10 upon reentry into the atmosphere. Coating the ribs 18 with SiC while keeping the graphite material of openings 20 may be done by covering the openings 20 with a masking material during CVD deposition of SiC or by removing deposited SiC as described in more detail below.

Figure 5A:
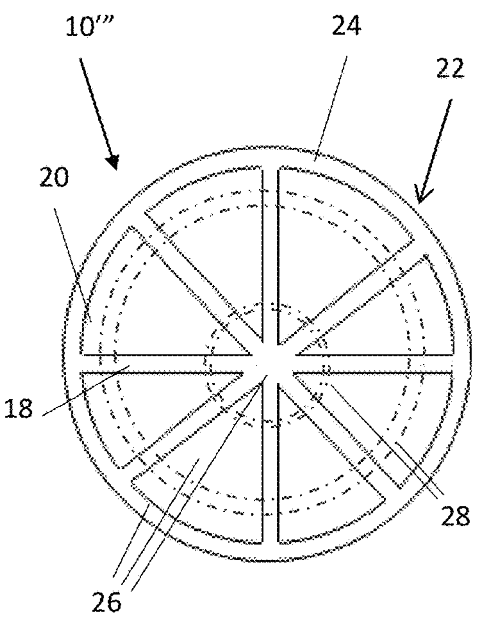
FIG. 5A is a schematic drawing of a mirror according to yet still another embodiment of the disclosure.
Figure 5B:
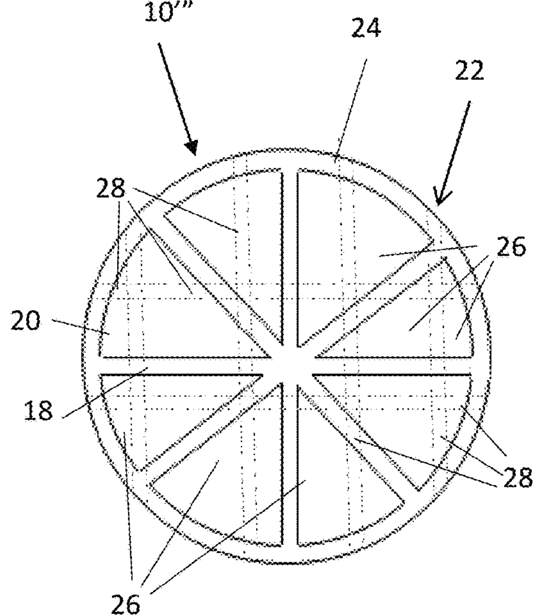
FIG. 5B is a schematic drawing of a mirror according to yet still another embodiment of the disclosure.

Referring next to FIGS. 5A and 5B, bottom views of yet still another exemplary embodiment mirrors 10'" is illustrated. Mirrors 10'" are similar to mirror 10 illustrated in FIGS. 1A-1C and similar part numbers are used to illustrate similar features.

Mirror 10" includes an open bottom surface 22. Bottom surface 22 of mirror 10'" includes a plurality of distinct first portions 26 coated with SiC separated by uncoated portions 28. In some embodiments, the coated first portions 26 correspond to portions of the ribs 18 and the uncoated second portions correspond to the openings 20 and remaining portions of the ribs 18. FIG. 5A illustrates uncoated portions 28 as circular in shape, dividing a plurality of annular first uncoated first portions 26. FIG. 5B illustrates uncoated portions 28 as lines, dividing a plurality of uncoated first portions 26 (not all first portions 26 have been indicated in FIG. 5B). Other embodiments include uncoated portions 28 having other suitable shapes include lines, curves, and combinations thereof.

The SiC coating on the first portion 26 provides additional structural strength to mirror 10'". The exposed graphite material of uncoated second portions 28 allows for easier disintegration of support base 14 and mirror 10 upon reentry into the atmosphere. Mirror 10'" is likely to break into pieces corresponding to the plurality of first portions 26 due to the case of disintegration of the second portions 28. In some embodiments, the size of each of the first portions 26 is designed to be a critical size or less, where the critical size corresponds to a reduced danger of impact associated with the first portion 26 surviving reentry. Coating the first portion 26 with SiC while keeping the second portion 28 uncoated may be done by covering the area of bottom surface 22 corresponding to the second portion 28 with a masking material during CVD deposition of SiC or by removing deposited SiC as described in more detail below.

Figure 6:
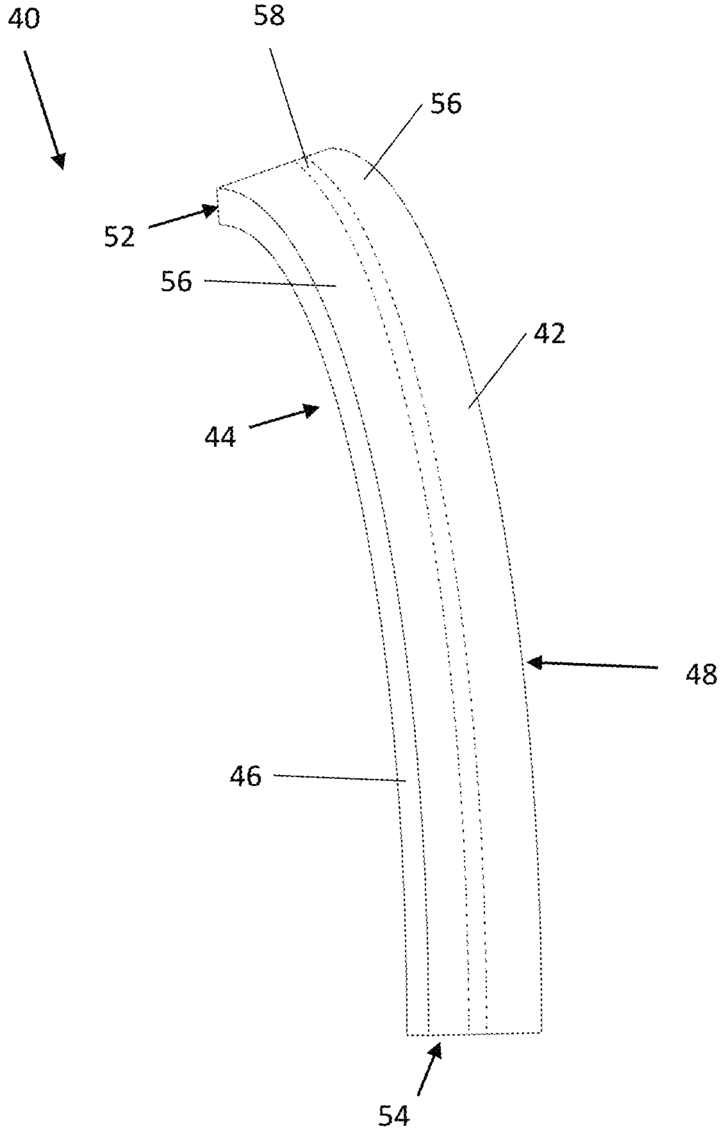
FIG. 6 is a schematic drawing of a structural strut according to yet still another embodiment of the disclosure.

Referring next to FIG. 6, a schematic drawing of a structural member 40 is illustrated. Structural member 40 is illustrated as being a strut curved in shape, however other suitable structural members and shapes may also be used including flat, annular, planar, and combinations thereof.

Structural member 40 includes a first side 42 and a second side 44 opposite first side 44. In some embodiments, structural member 40 may include additional sides, such as opposing third side 46 and fourth side 48, and opposing fifth side 52 and sixth side 54.

Structural member 40 comprises a graphite material. At least a portion of at least one side 42, 44, 46, 48, 52, 54 is coated with a thin layer of SiC formed on the outer surface of the side. Preferably, SiC is deposited directly on the side using chemical vapor deposition (CVD). At least a portion of the side 42, 44, 46, 48, 52, 54 opposite the coated side is exposed graphite, meaning graphite material that is not coated with SiC. Graphite may be exposed by covering portion with a masking material during CVD deposition of SiC or by removing deposited SiC.

In some embodiments, at least a portion of side 42 is coated with SiC and a portion of opposite side 44 is exposed graphite. In a more particular set of embodiments, all of side 42 is coated with SiC and all of opposite side 44 is exposed graphite. In another more particular set of embodiments, only a portion of side 42 is coated with SiC and all of opposite side 44 is exposed graphite. In another more particular set of embodiments, all of side 42 is coated with SiC and only a portion of opposite side 44 is exposed graphite. In another more particular set of embodiments, only a portion of side 42 is coated with SiC and only a portion of opposite side 46 is exposed graphite.

In some embodiments, a portion of one or more of sides 46, 48, 52, and/or 54 is also coated with SiC and/or a portion of one or more of sides 46, 48, 52, and/or 54 is exposed graphite. In a more particular set of examples, contiguous sides 42, 46, and 48 are coated with SiC and side 44 opposite side 42 is exposed graphite. In another more particular set of examples, sides 52 and 54 are also coated with SiC.

In another set of embodiments, at least one side such as side 42 and/or side 44 includes a plurality of distinct first portions 56 coated with SiC separated by uncoated portions 58. FIG. 6 illustrates uncoated portions 58 as lines, dividing a plurality of uncoated first portions 56. Other embodiments include uncoated portions 28 having other suitable shapes include lines, curves, triangles, rectangles, diamonds, grid patterns, and combinations thereof. The SiC coating on the first portion 56 provides additional structural strength structural member 40. The exposed graphite material of uncoated second portions 58 allows for easier disintegration of structural member 40 upon reentry into the atmosphere. Structural member 40 is likely to break into pieces corresponding to the plurality of first portions 56 due to the case of disintegration of the second portions 58. In some embodiments, the size of each of the first portions 56 is designed to be a critical size or less, where the critical size corresponds to a reduced danger of impact associated with the first portion 56 surviving reentry. Coating the first portion 56 with SiC while keeping the second portion 58 uncoated may be done by covering the area of side 42 corresponding to the second portion 58 with a masking material during CVD deposition of SiC or by removing deposited SiC.

Figure 7:
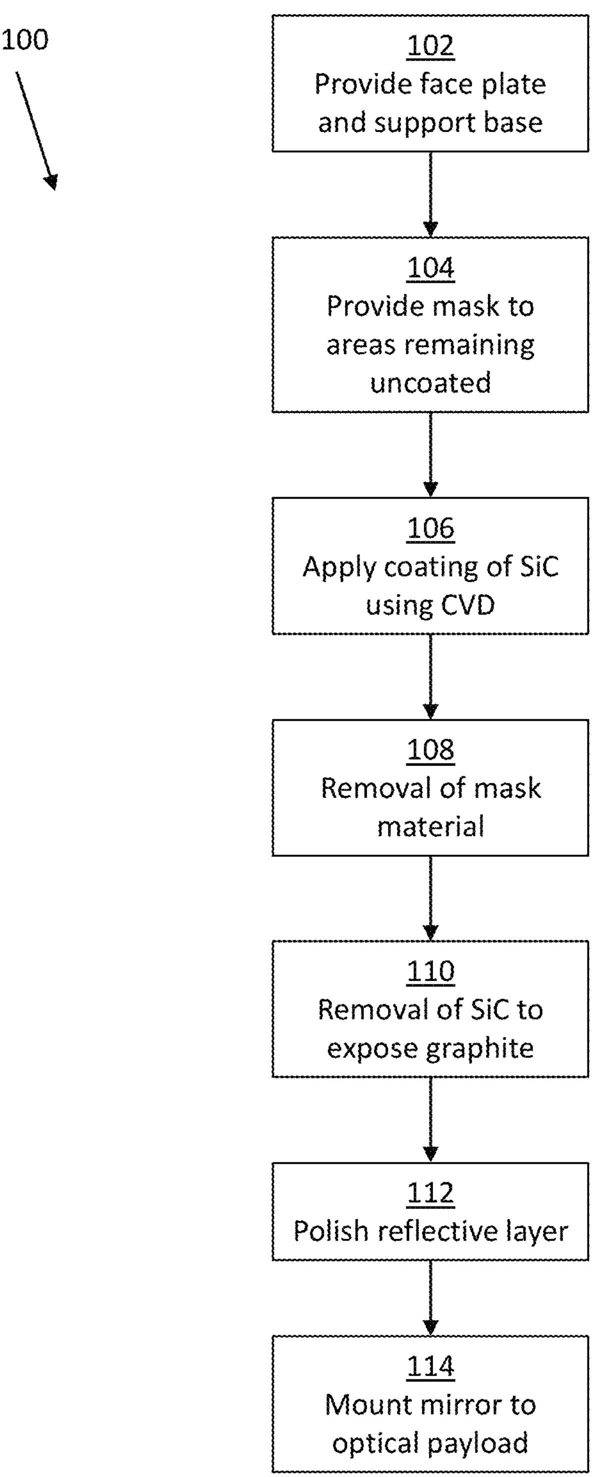
FIG. 7 is an exemplary process to produce a mirror according to various embodiments of the disclosure.

FIG. 7 is an exemplary process 100 to produce a mirror 10 according to various embodiments of the disclosure. Process 100 may also be used to produce mirrors 10', 10", and 10'", or a similar CVD process may be used to produce a structural member, such as strut 40.

In block 102, the face plate 12 and support base 14 are provided. Support base 14 comprises graphite and may be formed by machining or milling a brick of graphite into the desired structure. Graphite bricks are commercially available and may be produced by mixing graphite powder and a binder, then forming the mixture into a brick via compression molding and baking the brick in the absence of oxygen. The entire mirror body may be machined as one piece, or the face plate 12 and the support base 14 may be formed separately and then bonded together. The graphite may be natural or synthetic. Natural graphite may be selected from one or more of crystalline, amorphous, or flake. Preferably the graphite is synthetic graphite. Synthetic graphite may be obtained by graphitizing non-graphitic carbon, by chemical vapor deposition (CVD) from hydrocarbons at temperatures above 2500 K, by decomposition of thermally unstable carbides, or by crystallizing from metal melts supersaturated with carbon. Synthetic graphite generally has a high purity, typically greater than 99% carbon, greater than 99.5% carbon, greater than 99.9% carbon, or even greater than 99.99% carbon. Compared to natural graphite, synthetic graphite has a lower specific mass and it is more porous which generally makes it unsuitable for refractory application and helps facilitate oxidation.

In step 104, a mask is applied to any areas of the support base 14 that SiC is not to be deposited. Deposition of SiC using CVD will end up coating the entire body of the mirror, unless a mask is applied to the base of the mirror.

In step 106, a thin layer of SiC is formed on the outer surface of the face plate to form the reflective layer. Preferably, SiC is deposited directly on the face plate using chemical vapor deposition (CVD). CVD allows for the formation of a dense SiC layer. CVD methods for forming SiC layers are well known in the art, and include, but are not limited to atmospheric pressure chemical vapor deposition (APCVD), low-pressure chemical vapor deposition (LPCVD), and plasma enhanced chemical vapor deposition (PECVD). These methods are described in Jiang et al. *J. Nanomater.* 2012, 984048 (doi:10.1155/2012/984048), which is incorporated by reference herein in its entirety. In general, a SiC layer is produced by causing precursors to react in the vapor phase to deposit crystal grains of SiC onto a substrate. Suitable precursors include, but are not limited to, methyltrichlorosilane ($CH_3SiCl_3$) and hydrogen; and silane ($SiH_4$) and $C_2$-$C_3$ hydrocarbons or HCl. The specific CVD conditions (e.g., temperature, precursor feed rate and ratios, pressure, etc.) can impact the crystal structure, the grain size, and the density of the SiC, and hence the mechanical, thermal, and optical properties of the SiC.

In some embodiments, the support base may be partially or fully coated with a thin layer of SiC. Graphite, while having good thermochemical properties, has a lower strength and it is brittle compared to SiC. Providing a thin coating of SiC on part or all of the support base may improve the strength of the mirror body. The thickness of the SiC layer is typically no more than 200 μm, preferably no more than 100 μm, more preferably no more than 50 μm, or even more preferably no more than 10 μm. SiC layers produced using CVD have a high purity (99.9995%) and high density and are free of microcracks.

In step 108, the mask material, if any, applied in step 104 is removed to expose the graphite following SiC deposition.

In step 110, the SiC coating on the support base may be mechanically removed to expose all or a portion of the graphite base material. This step may be performed as an alternative to or in addition to application/removal of a mask material in steps 104 and 108.

In step 112, the reflective layer is polished to optical quality. Methods for obtaining optical grade SiC via polishing are known in the art and include, but are not limited to, mechanical polishing, wet polishing, ultra-precision grinding, tribo-chemical polishing, chemical mechanical polishing, electrolytic in-process dressing, magneto rheological finishing, laser-induced photochemical polishing, ion beam milling, float polishing, and combinations thereof. Polishing methods are described in Jiang (vide supra). Smooth surfaces are required for wavelengths falling in the range from 100 nm to 1,000 μm (i.e., range from the ultraviolet region to the infrared region). The degree of smoothness required is determined by the shortest wavelengths being reflected. In general, it is preferable that the roughness is λ/10 or less, preferably λ/20 or less, more preferably λ/50 or less, or even more preferably λ/100 or less. In some embodiments, after polishing, the optical layer has a surface roughness of less than 10 nm, of less than 9 nm, of less than 8 nm, of less than 7 nm, of less than 6 nm, of less than 5 nm, of less than 4 nm, of less than 3 nm, of less than 2 nm, of less than 1 nm, or less than 0.5 nm. In some embodiments, the optical layer has a surface roughness of about 0.1 nm, about 0.2 nm, about 0.3 nm, about 0.4 nm, about 0.5 nm, about 0.6 nm, about 0.7 nm, about 0.8 nm, about 0.9 nm, about 1 nm, about 2 nm, about 3 nm, about 4 nm, about 5 nm, about 6 nm, about 7 nm, about 8 nm, about 9 nm, about 10 nm, or any range within any two of these values.

In step 114, the mirror is mounted to an optical payload for deployment in a satellite environment.

Another aspect of the present disclosure is a method of making the optical mirror disclosed herein. The method comprises: providing a graphite body comprising a face plate and a support base, the support base positioned beneath the face plate and integrated with the bottom surface of the face plate; forming a layer of SiC using chemical vapor deposition on the outer surface of the face plate; and polishing the layer of SiC on the outer surface of the face plate to form a reflective layer. The support base may comprise a plurality of openings, such as voids or cut-outs. In some embodiments, the plurality of openings, or conversely the solid portions of the support base, may form a series of ribs, a grid, an iso-grid, a tessellation, or a honeycomb structure.

In some embodiments, the method of making the optical mirror comprises: providing a graphite body comprising a face plate and a support base, the support base positioned beneath the face plate and integrated with the bottom surface of the face plate; forming a layer of SiC using chemical vapor deposition on the outer surface of the face plate and the support base; removing at least a portion of the layer of SiC from the support base; and polishing the layer of SiC on the face plate to form a reflective layer. The support base may comprise a plurality of voids. In some embodiments, the plurality of openings, or conversely the solid portions of the support base, may form a series of ribs, a grid, an iso-grid, a tessellation, or a honeycomb structure.

In other embodiments, the method of making the optical mirror comprises: providing a graphite body comprising a face plate and a support base, the support base positioned beneath the face plate and integrated with the bottom surface of the face plate; forming a mask on the support base; forming a layer of SiC using chemical vapor deposition on the outer surface of the face plate face plate; removing the mask from the support base; and polishing the layer of SiC on the outer surface of the face plate to form a reflective layer. In some embodiments, support base comprises a plurality of openings. The plurality of openings, or conversely the solid portions of the support base, may form a series of ribs, a grid, an iso-grid, a tessellation, or a honeycomb structure.

Various modifications of the above described disclosure will be evident to those skilled in the art. It is intended that such modifications are included within the scope of the following claims.

What is claimed is:

1. A satellite component comprising:

a graphite body having a first outer surface coated with silicon carbide (SiC); and a second outer surface positioned below the first outer surface, the second outer surface comprising exposed graphite.

2. The satellite component of claim 1, wherein the satellite component is a satellite payload comprising an optical mirror wherein:

the graphite body comprises a face plate and a support base;

the first outer surface coated with SiC is a reflective layer integrally formed on an outer surface of the face plate; and the second outer surface is a bottom surface of the support based positioned beneath the face plate.

3. The satellite component according to claim 2, wherein at least a portion of the bottom surface of the support base is not coated with SiC.

4. The satellite component according to claim 2, wherein the SiC reflective layer is deposited on the outer surface of the face plate using chemical vapor deposition.

5. The satellite component according to claim 2, wherein the support base comprises a sidewall along a perimeter of the support base, the sidewall comprising graphite.

6. The satellite component according to claim 5, wherein the bottom surface comprises a plurality of ribs defining a plurality of openings, the sidewall comprising a plurality of access holes extending through the sidewall from an outer surface of the support body through the sidewall to the openings.

7. The satellite component according to claim 6, wherein the openings comprise exposed graphite and further comprising a bottom cover at least partially covering the bottom surface of the support base.

8. The satellite component according to claim 2, wherein the bottom surface comprises a plurality of ribs defining a plurality of openings, at least a portion of the plurality of ribs or a portion of the plurality of openings comprises the exposed graphite.

9. The satellite component according to claim 8, wherein the plurality of openings forms series of circular ribs, a grid, an iso-grid, a tessellation, or a honeycomb structure.

10. The satellite component according to claim 9, wherein at least a portion of the plurality of the ribs or a portion of the openings is coated with SiC.

11. The satellite component according to claim 2, wherein the graphite body comprises an integrated graphite face plate and support base and the reflective layer is formed directly on the graphite of the face plate.

12. The satellite component according to claim 2, wherein the bottom surface includes a plurality of first portions coated with SiC, the plurality of first portions being separate from each other by a second portion of the bottom surface that is not coated with SiC.

13. The satellite component according to claim 1, wherein the second outer surface is configured to break into the plurality of first portions upon disintegration of the satellite component.

14. The satellite component of claim 1, wherein the satellite component is a structural strut.

15. A method for making a satellite component, comprising:

providing a graphite body comprising a face plate and a support base, wherein the support base is positioned beneath the face plate and integrated with the bottom surface of the face plate;

depositing a layer of SiC using chemical vapor deposition on the outer surface of the face plate, wherein a bottom surface of the support base positioned beneath the face plate comprises exposed graphite;

applying a mask to the support base to prevent deposition of SiC onto a portion of the support base covered by the mask; and removing the mask to expose the exposed graphite.

16. The method according to claim 15, further comprising:

depositing a layer of SiC using chemical vapor deposition on the bottom surface of the support base; and mechanically removing a portion of the SiC deposited on the bottom surface of the support base to expose the exposed graphite.

17. The method according to claim 15, wherein the bottom surface comprises a plurality of ribs defining a plurality of openings, at least a portion of the plurality of ribs or a portion of the plurality of openings comprises the exposed graphite.

18. The method according to claim 17, wherein the plurality of openings forms a series of circular ribs, a grid, an iso-grid, a tessellation, or a honeycomb structure.

19. The method according to claim 17, wherein at least a portion of the plurality of the ribs or a portion of the openings is coated in SiC.

* * * * *